United States Patent [19]

Prewitt

[11] 4,197,041

[45] Apr. 8, 1980

[54] BORING TOOL

[76] Inventor: Floyd B. Prewitt, R.F.D. 3, Moberly, Mo. 65270

[21] Appl. No.: 901,608

[22] Filed: May 1, 1978

[51] Int. Cl.[2] ........................ B23B 39/14; B23B 45/14

[52] U.S. Cl. .................................... 408/102; 408/103; 408/111; 408/137

[58] Field of Search .................... 408/87, 99, 100, 101, 408/102, 103, 111, 137, 138

[56] References Cited

U.S. PATENT DOCUMENTS

| | | | |
|---|---|---|---|
| 288,510 | 11/1883 | Taft | 408/101 |
| 579,037 | 3/1897 | Bulock et al. | 408/101 |
| 589,110 | 8/1897 | Armstrong | 408/138 |
| 685,738 | 11/1901 | Bright | 408/102 X |
| 1,882,689 | 10/1932 | Albertson | 408/111 X |
| 2,508,402 | 5/1950 | Kjerulff | 408/137 X |
| 2,911,860 | 11/1959 | Winslow et al. | 408/111 X |
| 3,068,725 | 12/1962 | VerNooy | 408/111 X |
| 3,767,313 | 10/1973 | Bohoroquez et al. | 408/137 X |
| 4,090,805 | 5/1978 | Grimsley | 408/111 |

OTHER PUBLICATIONS

Design News, p. 6, 8-8-77, "Flexible Shaft-Key to Difficult Drilling", J. P. Lerro Jr.

*Primary Examiner*—William R. Briggs

*Attorney, Agent, or Firm*—Rogers, Eilers & Howell

[57] ABSTRACT

A compact boring tool has a support base with a pair of blocks mounted thereon to mount a work piece and a feed support block spaced apart therefrom having a threaded opening for supporting a feed screw. The feed screw has threads matching the threaded opening of the support block and a quill rotatably mounted through its center, the quill having a socket head for being driven and a shank end for receiving and securing a drill bit or drill chuck. A locking pin selectively locks the quill to the feed screw to provide for power backing out of the feed screw and quill after a hole has been drilled in the work. A support plate attachment is provided for converting the boring tool for surface boring operation.

1 Claim, 8 Drawing Figures

FIG. 1.
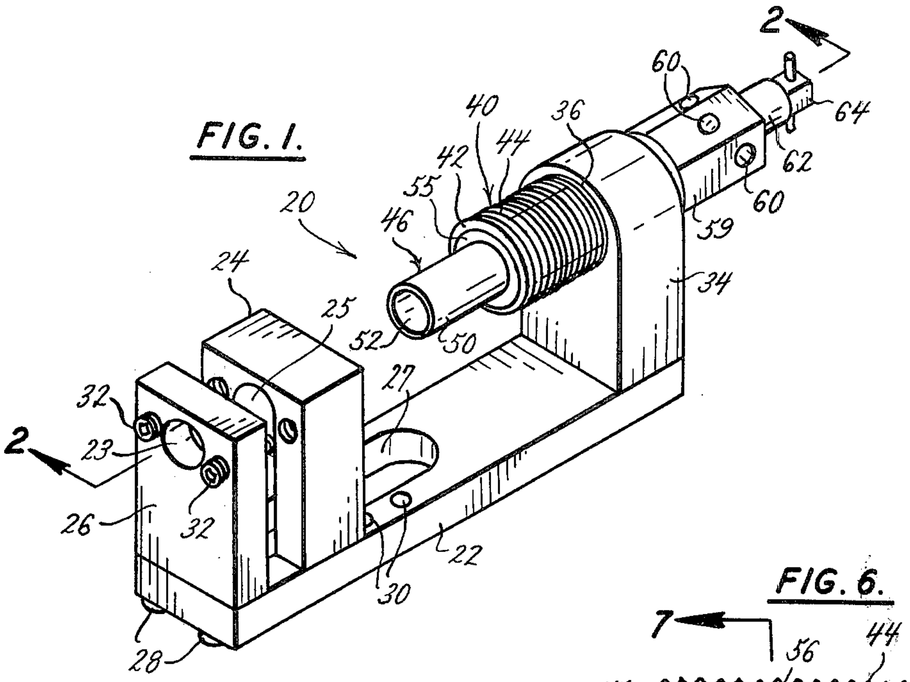
FIG. 6.
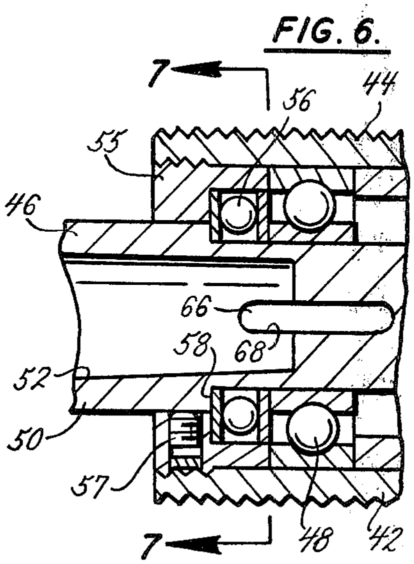
FIG. 8.
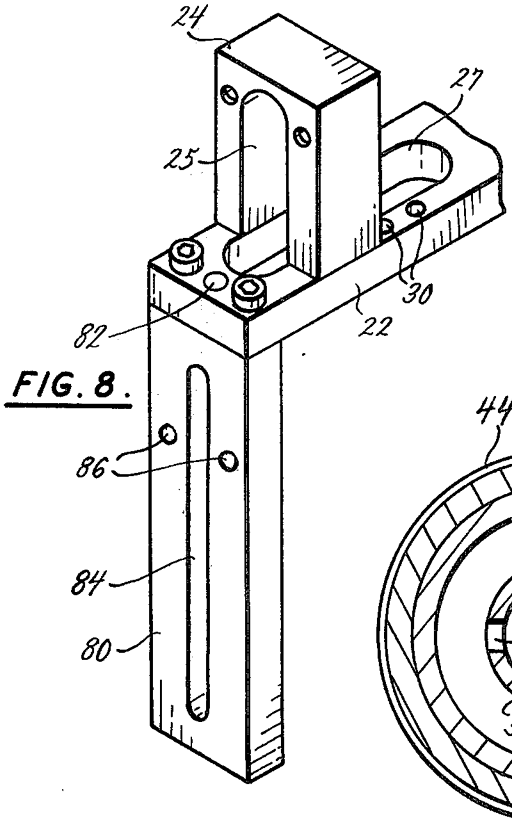
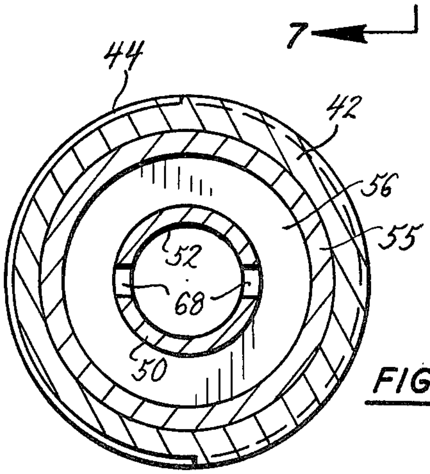
FIG. 7.

FIG. 4.
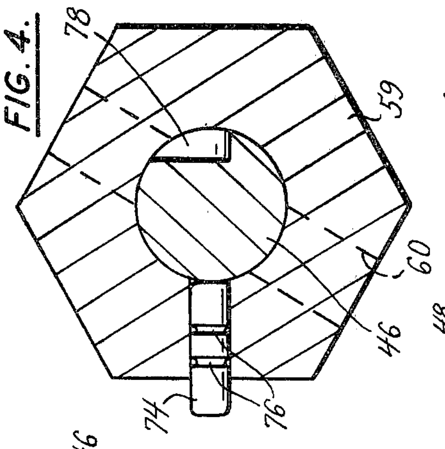
FIG. 5.
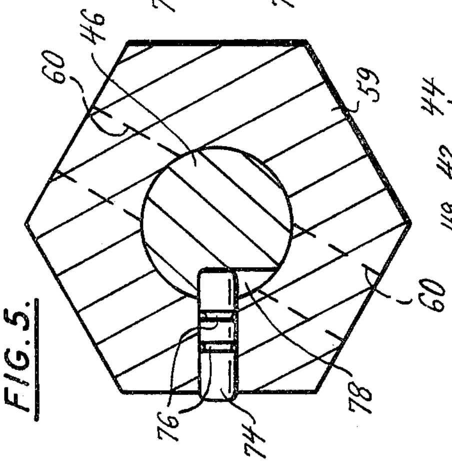
FIG. 3.
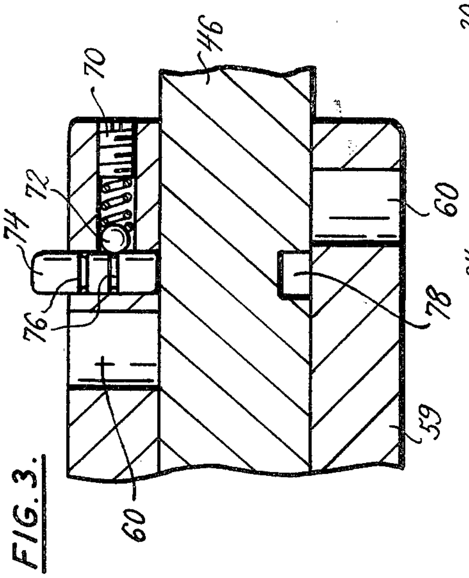
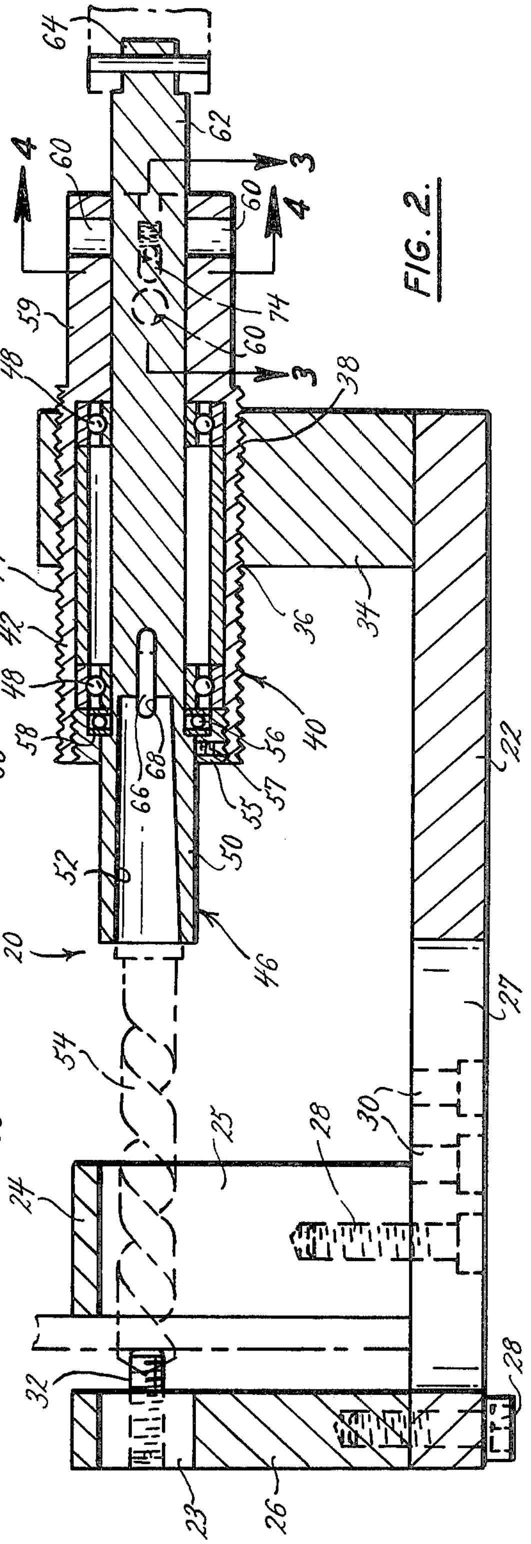
FIG. 2.

BORING TOOL

BACKGROUND AND SUMMARY

To precision drill or bore holes into steel, iron, and other hardened metals, a drill press or boring machine is required having a fixture or jig to maintain the work in a fixed position in combination with a drill press mechanism to accurately position, drive, and feed a drill bit into the work. In the past, these machines were quite bulky as the drill press portion must be capable of developing substantial amounts of torque and pressure in the bit against the work and the fixture must be capable of maintaining the work in a fixed position against these substantial forces. Also, large drive motors were usually required along with some type of lever action drill press mechanism for advancing and retracting the bit from the work in the feeding operation. Another requirement for the accurate boring of holes is a tool which can maintain a steady feed rate which is fully adjustable over a wide range of values for differing types of materials. This can be understood by realizing that the amount of energy required at the point of the drill bit is determined by the size of hole being bored and the shaving cut per revolution as the bit rotates and cuts into the work. If the hole is smaller or the shaving thinner, then a smaller amount of energy is required which means that a smaller amount of torque, feed pressure, and horsepower to drive the bit are needed for the boring operation. As the hole size increases or the shaving thickness is increased, then greater amounts of energy are required to step up these force requirements to accomplish the same boring operation. To provide for a smooth and even boring operation, and to minimize the heating of the drill bit a constant feed rate throughout is the most desirable operating mode. Furthermore, the drill bit may have a tendency to hang up or jam if the feed rate is suddenly decreased as the bit is boring into the work. This may result in a broken drill bit, a burned out drive motor, or if a hand drill is used, then the kick back experienced at the drill may be enough to break a man's arm. Thus, the drill press must be capable of maintaining a constant feed rate throughout a drilling or boring operation.

In the prior art, machines are available which are floor standing and are quite expensive in that lever action or gearing is used to develop the feed pressure and complicated feed mechanisms are used to ensure accurate positioning and feeding of the bit in relation to the jig or fixture. Also, the jig or fixture may be quite bulky and complicated in order to maintain the work in a fixed position while it is being bored under substantial pressure and to provide for accurate repositioning of the work during a multiple boring operation.

Applicant has developed a boring tool which is highly compact and portable and which provides many of the same advantages found in much larger and more complex drill presses and boring tools. Applicant's device has structure for accurate positioning of a work piece and has an attachment which provides for surface boring operation. Some of the features of applicant's device include a very accurate feed mechanism which is capable of developing very high torque, full bearing support between the feed means and the drilling means, an attachment which provides for an external drive means, fully interchangeable drill bits and chucks, a locking pin arrangement to provide power backing out of the drill bit away from the work, and other features as are apparent from the following description.

Applicant's boring tool may weigh as little as 35 lbs. and have a small bulk which permits use in a portable mode in very tight, cramped quarters. Conversely, applicant's boring tool may be used in a machine shop operation to replace much larger and more expensive machines otherwise required to precision drill perfect 90° holes in hardened steel and other materials resistant to machining operations. A normal half inch or three quarter inch hand drill may be used to drive the drill bit in applicant's boring device as both radial and thrust bearings are provided between the drill bit and the feed means. These bearings effectively isolate the hand drill or other drive means from the drill bit and provide for a smooth and continuous drilling operation. Kick back, chattering and other difficulties sometimes experienced in other boring tools are eliminated by isolating the drill bit from the driving means.

Another advantage of applicant's device is that it is significantly reduced in bulk and size and is adapted to be used in a portable manner and for surface boring. A support plate attaches to the base plate of the device and the boring tool may be bolted to the surface being drilled by either an existing hole or a hole previously drilled by applicant's tool. Thus, the boring tool may be accurately positioned to drill a hole anywhere on a surface within a circle having a radius equal to the distance between the bit and the far end of the positioning slot in the support plate from an existing hole. The compact size of the boring tool allows the tool to be used in very tight and cramped quarters as is encountered in many construction jobs including the steel work for bridges and large buildings.

The above features and other advantages may be more fully understood by referring to the drawings and description of the preferred embodiment as follows.

BRIEF DESCRIPTION OF THE DRAWINGS

FIG. 1 is a perspective view of the boring tool;

FIG. 2 is a cross-sectional view taken along the plane of line 2—2 in FIG. 1;

FIG. 3 is a cross-sectional view detailing the locking pin taken along the plane of line 3—3 in FIG. 2;

FIG. 4 is a cross-sectional view further detailing the locking pin and taken along the plane of line 4—4 in FIG. 2;

FIG. 5 is a cross-sectional view similar to FIG. 4, except with the locking pin in the locked position;

FIG. 6 is a broken cross-sectional view detailing the bearings between the quill and feed screw;

FIG. 7 is a cross-sectional view taken along the plane of line 7—7 in FIG. 6 further detailing the quill and bearing arrangement; and FIG. 8 is a broken perspective view detailing the support plate modification to the boring tool.

DESCRIPTION OF THE PREFERRED EMBODIMENT

Applicant's boring tool 20 has a base plate 22, a guide block 24, and a positioning block 26. Guide block 24 and positioning block 26 are mounted to the base plate 22 by bolts or cap screws 28 which fit through mounting holes 30. Positioning block 26 has a hole 23, guide block 24 has a slot 25, and base plate 22 has a slot 27 to allow observation of the boring operation from various angles. As shown in FIGS. 1 and 2, guide block 24 is mounted to base plate 22 by mounting holes 30 which allow it to be positioned at varying distances from positioning block 26 to accommodate different sizes of work. Set screws 32 are mounted in positioning block 26 and are used to secure the work against the guide block 24. At the opposite end of the base plate 22, a feed support block 34 is mounted with bolts similar to mounting bolts 28 and has a threaded opening 36 with threads 38 for supporting feed screw 40. Dowel pins (not shown) may also be used to mount and stabilize any of the blocks 24, 26, 34. Feed screw 40 has a threaded chuck 42 with threads 44 matching the threads 38 of feed support 34. Threads 38, 44 may be sized at 16 threads/inch and the diameter of feed screw 40 approximately two and one half inches to provide a smooth feed rate and allow hand operation to develop suitable torque and pressure. A quill 46 is rotatably supported by radial bearings 48 from the feed screw 40 and has a shank end 50 with a Morse taper 52 machined along its inner surface to receive and secure a drill bit 54 or drill chuck (not shown). A bearing collar 55 is threaded into the feed screw 40 and positions a thrust bearing 56 adjacent the radial bearing 48. A set screw 57 is used to fix the bearing collar 55 in position inside the feed screw 40 and additional retaining structure such as a brass plug (not shown) may be provided to fix the bearing collar 55, as is known in the art. The quill 46 has a shoulder 58 which rests on thrust bearing 56 and is supported thereby during a boring operation. The feed screw 40 has a drive head 59 which may be hexagonally shaped and contain drive holes 60 as an aid in turning the feed screw 40 and advancing or retracting it through the threaded opening 36 of the feed support 34. The shaft end 62 of the quill 46 extends through the length of feed screw 40 and has a socket head 64 to provide means for attaching a drive mechanism (not shown). Drill bit 54 may also have a tang 66 which fits into a receiving slot 68 in quill 46 to ensure that drill bit 54 does not work its way loose during a drilling operation.

As shown in FIGS. 3, 4, and 5, structure is provided to lock the quill 46 to the feed screw 40 and thus use the drive means which powers the drill bit 54 to back out the feed screw 40 and retract the drill bit 54 from the work. A set screw 70 having a spring loaded ball 72 extends through the drive head 59 to contact a locking pin 74. Locking pin 74 has two grooves 76 which engage the spring loaded ball 72 and hold the locking pin 74 in either the locked or unlocked position. This is best shown in FIG. 3. A keyway 78 is machined into the quill 46 for receiving locking pin 74. As shown in FIG. 5, locking pin 74 has been moved into the locked position and is engaging the keyway 78 of quill 46. In this position, it can be seen that rotation of the quill 46 in the counterclockwise direction will also rotate the drive head 59 and thus move the feed screw 40 through the feed support 34 in a counterclockwise rotation which retracts drill bit 54 away from the work. If the quill 46 is driven in a clockwise rotation, keyway 78 is of such a configuration that it will push locking pin 74 back into an unlocked position and avoid power feeding of the quill 46 in a direction towards the work. Thus, locking pin 74 may only be used to power the feed screw 40 away from the work.

Boring tool 20 may also be slightly modified for use in a surface boring mode as shown in FIG. 8. To convert boring tool 20 for surface boring use, positioning block 26 may be removed from base plate 22 and support plate 80 is installed and extends perpendicularly to base plate 22. A dowel pin 82 may extend between support plate 80 and through base plate 22 as an aid in positioning support plate 80 and maintaining it in a strictly perpendicular orientation. Support plate 80 has a positioning slot 84 which is used to attach support plate 80 to a work area and fix boring tool 20 in a position to bore a hole in the work. Guide block 24 and/or positioning block 26 may be mounted adjacent support plate 80 to further reinforce the boring tool 20 when larger drill bits 54 are used.

OPERATION

Applicant's boring tool 20 can be constructed of separately machined and shock resistant, heat treated tool steel parts which are then bolted together and adjusted to ensure proper alignment of the work piece and the drill bit 54. Likewise, the feed screw 40 and its support 34 are fully adjustable and alignable to ensure a perfect 90° hole is bored into the work. After the basic parts are assembled, including the base plate 22, guide block 24, positioning block 26, and feed support 34; the feed screw 40 may be threaded into the threaded opening 36. Feed screw 40 should be positioned so that when the drill bit 54 or drill chuck (not shown) is installed it provides ample clearance for inserting and securing the work between guide block 24 and positioning block 36. The quill 46 may already be installed and in position in the feed screw 40 or it may be inserted and secured after the feed screw 40 is installed. Suitable retainer rings (not shown) or other retaining structure as is known in the art may be used to rotatably secure the quill 46 in position and supported from bearings 48, 56. It should be noted that the shoulder 58 of the shank end 50 should be resting on thrust bearing 56 to ensure a positive seating and transfer of load from the quill 46 to the thrust bearing 56. A drill bit 54 may then be inserted into the quill 46 through hole 23 in positioning block 26 and slot 25 in guide block 24. Either varying sizes of drill bits 54 may be directly installed in the quill 46 or a drill chuck (not shown) may be installed which may be adjusted to accommodate drill bits 54 having different shaft diameters. For purposes of clarity, the description will mention only drill bit 54 but it is to be understood that a drill chuck or other structure may be used in its place. A Morse taper 52 in the interior of the quill 46 should match a similar Morse taper on drill bit 54 to provide for a positive engagement between the two, as is known in the art. Tang 66 of drill bit 54 should be lined up with receiving slot 68 in quill 46 before insertion of drill bit 54. Thus, drill bit 54 is held in position by Morse taper 52 and tang 66 and receiving slot 68 provide a safety to prevent a loosening of drill bit 54 during operation. The work may then be inserted in position between positioning block 26 and the adjustable guide block 24. Guide block 24 may be positioned at a varying distance from positioning block 26 by means of mounting holes 30 which are located along base plate 22, depending on the thickness of the work. After the work has been inserted, set screws 32 in positioning block 26 are tightened against the work to hold it securely in abutment with guide block 24. After the work has been positioned, the drive means should be secured to the socket head 64 of the quill 46 and made ready for operation. The feed screw 40 may then be advanced through its support 34 by hand turning of drive head 59 until the leading edge of drill bit 54 is almost in contact with the work. Boring of a hole may then begin by activating the drive means, and advancing the feed screw 40 by turning the drive head 59 either by hand or by inserting a rod (not shown)

in the drive holes 60 to develop an increased torque and provide for greater control of the feed rate. The feed screw 40 is advanced until drill bit 54 completes its boring and a perfectly formed 90° hole is drilled into the work. The drive means may then be shut down and the locking pin 74 pushed into its locked position by engaging keyway 78 in quill 46. The quill 46 may "float" away from engagement between its shoulder 58 and thrust bearing 56, but it may be easily re-positioned by sliding it back in place. Quill 46 may then be rotated to align keyway 78 with locking pin 74. With locking pin 74 in its locked position, the drive means may be reversed and activated again to power the feed screw 40 in a counterclockwise direction and retract drill bit 54 out of the finished hole. If desired, locking pin 74 need not be used and feed screw 40 may be backed out by hand or with use of the rod previously described.

Applicant's boring tool 20 can be used to develop high torques and thrust with a minimum amount of horsepower in the drive means while eliminating the tendency of the drill bit 54 to hang up or chatter during boring operation. For example, applicant's boring tool 20 may be used in combination with a two-fifths horsepower hand drill and a seven-eighths inch drill bit to bore holes in heat treated steel SAE 3250 which would otherwise require fifteen hundred pounds of thrust, forty five foot-pounds of torque and two horsepower at the drill point. In fact, applicant's tool 20 will develop over 3 tons of pressure at the drill bit 54 if a 2½ inch diameter feed screw 40 is used having 16 threads per inch and a force of 100 lbs. is applied to a rod 12 inches long to turn the feed screw 40, assuming a coefficient of friction of 0.16. Significantly higher levels of torque and thrust may be accommodated through use of a drive means having more horsepower, but applicant has found that the hand drill used in combination with his boring tool 20 provides these greatly increased torque and thrust capabilities while eliminating the tendency of drill bit hang up and chattering. For example, if a three-quarter inch or larger hand drill hangs up while drilling a hole, the kick back experienced may be enough to break the operator's arm. With applicant's boring tool 20, this tendency is almost completely eliminated and applicant has found that he may drill a second hole which runs into a first hole without experiencing the kick back or chattering usually expected under these circumstances. Another advantage in applicant's boring tool 20 is that life of the drill bit 54 is greatly increased over other prior art devices due to its ability to provide an accurate positioning of the bit against the work and a constant feed through the drilling operation. This eliminates excess heating and cocking of the bit, which are the greatest causes of bit wear.

Applicant's boring tool 20 may be converted for surface boring by removing positioning block 26 and fastening support plate 80 onto base plate 22. In this configuration, the boring tool 20 may be used to directly bore holes in a flat surface by bolting the support plate 80 to the flat surface through the positioning slot 84. As shown in FIG. 8, the boring tool 20 may then be used to bore a hole anywhere within a circle having a radius equal to the distance between the drill bit 54 and the far end of positioning slot 84. A slot 27 is provided in the base plate 22 and along with slot 25 in the guide block 24 to provide increased visibility of the drill bit 54 as the tool is aligned and during the boring operation.

The relatively narrow width of the boring tool 20 allows it to be used in cramped quarters previously requiring the use of hand held drills.

Various changes and modifications could be made to applicant's preferred embodiment as would be obvious to one of ordinary skill in the art and applicant does not intend that his invention be limited to the particular structure described in the preferred embodiment. Applicant intends that his invention be limited only by the scope of the claims appended hereto.

What is claimed is:

1. A self supporting, portable, compact boring tool for boring holes in a work comprising a base, a feed support means fastened to said base, means defining a threaded opening in said feed support, a feed screw having a threaded section adapted to be received by said threaded opening and provide for movement of the feed screw in an axial direction as the feed screw is rotated with respect to said threaded opening, said feed screw having a drive head of approximately hexagonal shape and means defining holes in said drive head to aid in rotating said feed screw and applying torque thereto, a quill extending through the center of the feed screw, at least two radial bearings rotatably supporting the quill from the feed screw, the quill having a shoulder and a thrust bearing mounted to said feed screw to support said shoulder from said feed screw, the quill having a shank end with a tapered inner wall adapted to receive and hold a drill bit having a matching tapered shaft, means defining a slot in said quill for receiving a tang of a drill bit, a socket head on the quill opposite the shank end and adapted to receive a drive ratchet for driving connection to a drive means, locking means to selectively secure the quill means to the feed screw including a locking pin having two spaced apart grooves extending through the feed screw drive head, a set screw having a spring loaded ball extending perpendicularly to said locking pin and engaging said grooves in said locking pin, means defining a keyway in the quill to receive the locking pin, said keyway having means to retain the pin in its locked position as the quill is rotated in a first direction causing the feed screw to move away from the work and means to automatically move the locking pin from its locked position to its free position as the quill is rotated opposite the first direction so that the locking pin provides for the feed means to be driven away from the work by the quill means, work positioning means including a guide block and a positioning block detachably mounted on the base, said guide block being mounted between the feed screw and the positioning block and having means to adjust its mounting position on said base, a plurality of set screws extending through the positioning block and aligned substantially on a plane with the centerline of the feed screw, said set screws being adapted to fixedly secure the work against the guide block, and means to convert said boring tool for surface boring including a selectively detachable support plate, means on said base plate to alternatively mount said support plate or said positioning block, said support plate having a positioning slot for securing the boring tool to a work area so that a hole bored by said boring tool may be used to secure the boring tool to the work, said support plate having means to adjust the location of the boring tool with respect to the work.

* * * * *